US011167472B2

(12) United States Patent
Dueformantel

(10) Patent No.: US 11,167,472 B2
(45) Date of Patent: Nov. 9, 2021

(54) METHOD AND APPARATUS FOR THE ADDITIVE MANUFACTURING OF A THREE-DIMENSIONAL WORKPIECE

(71) Applicant: Robert Bosch GmbH, Stuttgart (DE)

(72) Inventor: Christian Dueformantel, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 16/347,832

(22) PCT Filed: Oct. 30, 2017

(86) PCT No.: PCT/EP2017/077772
§ 371 (c)(1),
(2) Date: May 7, 2019

(87) PCT Pub. No.: WO2018/086937
PCT Pub. Date: May 17, 2018

(65) Prior Publication Data
US 2019/0315050 A1    Oct. 17, 2019

(30) Foreign Application Priority Data
Nov. 8, 2016 (DE) ...................... 10 2016 221 821.2

(51) Int. Cl.
*B29C 64/124* (2017.01)
*B29C 64/245* (2017.01)
(Continued)

(52) U.S. Cl.
CPC ............ *B29C 64/124* (2017.08); *B29C 35/16* (2013.01); *B29C 64/245* (2017.08);
(Continued)

(58) Field of Classification Search
CPC ..... B29C 35/16; B29C 64/124; B29C 64/245; B29C 64/30; B29C 64/364; B29C 64/379;
(Continued)

(56) References Cited

U.S. PATENT DOCUMENTS

| 658,412 A | 9/1900 | Westman |
| 2016/0214175 A1 | 7/2016 | Nordstrom |
| 2018/0099332 A1* | 4/2018 | Shaw ..................... B33Y 30/00 |

FOREIGN PATENT DOCUMENTS

CN    204149528 U    2/2015
CN    204894557      12/2015
(Continued)

OTHER PUBLICATIONS

International Search Report for Application No. PCT/EP2017/077772 dated Jan. 22, 2018 (English Translation, 2 pages).

*Primary Examiner* — Robert J Grun
(74) *Attorney, Agent, or Firm* — Michael Best & Friedrich LLP

(57) ABSTRACT

The invention relates to a method for the additive manufacturing of a three-dimensional workpiece, in the case of which a thermoplastic material is transferred into a liquid phase by heating and is applied selectively to locations which are predetermined by the shape and the dimensions of the workpiece, wherein the workpiece is constructed in layers on a substrate carrier. According to the invention, in order for the material to be cooled and hardened, the workpiece, which is constructed in layers on the substrate carrier, is moved from a heated construction chamber into a cooling chamber, which is separate from the construction chamber. The invention also relates to an apparatus for the additive manufacturing of a three-dimensional workpiece.

19 Claims, 1 Drawing Sheet

(51) Int. Cl.
  *B29C 64/364* (2017.01)
  *B29C 64/379* (2017.01)
  *B29C 35/16* (2006.01)
  *B33Y 10/00* (2015.01)
  *B33Y 30/00* (2015.01)
  *B33Y 40/00* (2020.01)
(52) U.S. Cl.
  CPC .......... *B29C 64/364* (2017.08); *B29C 64/379* (2017.08); *B33Y 10/00* (2014.12); *B33Y 30/00* (2014.12); *B33Y 40/00* (2014.12)
(58) Field of Classification Search
  CPC ......... B29C 71/02; B33Y 10/00; B33Y 30/00; B33Y 40/00
  See application file for complete search history.

(56) References Cited

FOREIGN PATENT DOCUMENTS

| | | | | |
|---|---|---|---|---|
| CN | 105711086 A | 6/2016 | | |
| CN | 205553246 U | 9/2016 | | |
| DE | 102017215839 A1 * | 3/2019 | ........... | B23K 26/123 |
| WO | 0078519 | 12/2000 | | |

* cited by examiner

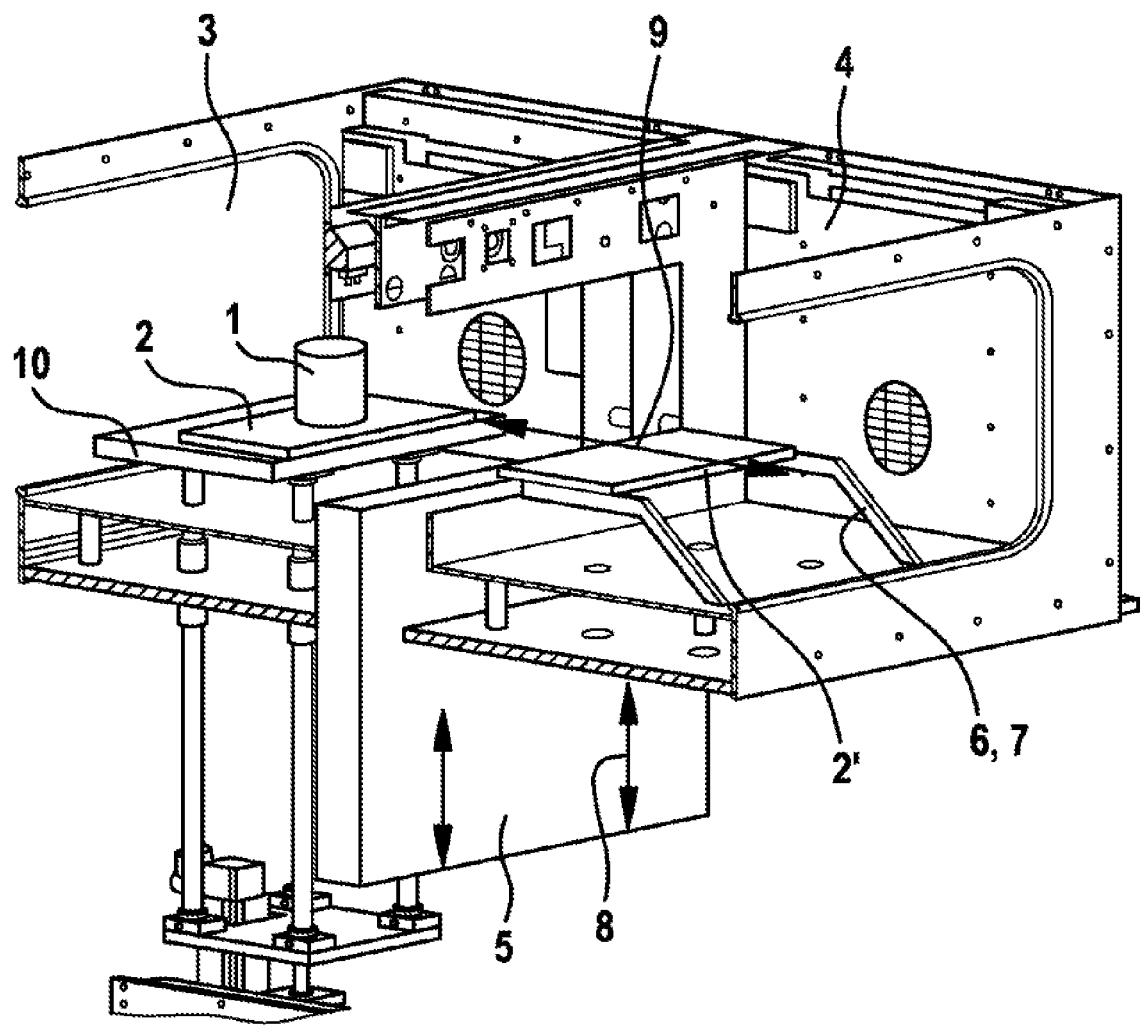

METHOD AND APPARATUS FOR THE ADDITIVE MANUFACTURING OF A THREE-DIMENSIONAL WORKPIECE

BACKGROUND OF THE INVENTION

The present invention relates to a method for the additive manufacturing of a three-dimensional workpiece in which a thermoplastic material is changed by heating to a liquid phase and selectively applied at locations which are predetermined by the shape and the dimensions of the workpiece, wherein the workpiece is built up in layers on a substrate carrier. Furthermore, the invention relates to an apparatus for the additive manufacturing of a three-dimensional workpiece from a thermoplastic material which is liquefied by heating, comprising a construction chamber which can preferably be heated for receiving a substrate carrier on which the workpiece can be built up in layers.

The apparatus according to the invention may in particular be used to carry out the method according to the invention.

In additive manufacturing or during 3D printing, liquid or solid materials are built up in layers to form a three-dimensional workpiece. For example, thermoplastic materials, in particular thermoplastic plastics materials, can be used and are first liquefied by means of heating. The liquid material is then selectively applied at locations at which the workpiece is intended to be produced. With cooling, the material solidifies again.

Some thermoplastic materials have a tendency to shrink during cooling. The shrinking leads to differing dimensions of the completed workpiece. In order to counteract this, 3D printers with heatable construction chambers are known so that a constant temperature control of the construction chamber is possible during the printing operation. If the printing operation is ended, the construction chamber is cooled in a controlled manner in order to enable cooling and solidification of the workpiece. After the cooling, the workpiece is removed and a new printing operation can be started with the construction chamber being heated again

SUMMARY OF THE INVENTION

An object of the invention is to configure the additive manufacturing of a three-dimensional workpiece from a thermoplastic material in a more efficient and consequently more cost-effective manner.

In the proposed method for the additive manufacturing of a three-dimensional workpiece, a thermoplastic material is changed by means of heating to a liquid phase and selectively applied at locations which are predetermined by the shape and the dimensions of the workpiece. The workpiece is in this instance built up in layers on a substrate carrier. According to the invention, the workpiece which is built up in layers on the substrate carrier is moved to cool and solidify the material from a construction chamber, which is preferably heated, into a cooling chamber which is separated from the construction chamber. This means that, in the method according to the invention, the workpiece does not remain in the construction chamber for cooling and solidification. The construction chamber can consequently be used to produce another workpiece without having to interrupt the heating of the construction chamber if the construction chamber is heated. In this manner, valuable time can be saved since the otherwise conventional cooling and where applicable reheating of the construction chamber can take several hours. During this time, it is not possible to carry out a production operation with the result that this time is non-productive time. In the method according to the invention, this unproductive time is very significantly reduced. The additive manufacturing of a three-dimensional workpiece according to the method according to the invention, wherein it is preferably a 3D printing method, can consequently be carried out in a more efficient and cost-effective manner.

The cooling chamber is preferably arranged adjacent to the construction chamber so that a connection to the construction chamber can be produced in order to move the workpiece which is built up in layers on the substrate carrier from the construction chamber into the cooling chamber.

By automating the operation, the movement of the workpiece which is built up in layers on the substrate carrier from the construction chamber into the cooling chamber can be configured in a more efficient manner since in this instance no manual intervention is required.

In order to move the workpiece which is built up in layers on the substrate carrier from the construction chamber into the cooling chamber, there is preferably used a transport device by means of which the substrate carrier can be moved, in particular displaced and/or pivoted. Such a transport device can be constructed in a comparatively simple manner. The use of a transport device enables an automation of the operation. However, it is also possible to use a robot arm as a transport device.

Advantageously, with the movement of the workpiece from the construction chamber into the cooling chamber, a new, still unprinted substrate carrier is introduced into the construction chamber so that it is possible to continue production, in particular printing, whilst the workpiece which has already been produced or printed cools in the cooling chamber. The introduction of the still unprinted substrate carrier into the construction chamber is also preferably carried out automatically, for example, by means of the same transport device which also serves to move a printed substrate carrier from the construction chamber into the cooling chamber.

Preferably, therefore, after the cooling and solidification of the material, the substrate carrier with the workpiece is removed from the cooling chamber and replaced with a still unprinted substrate carrier. The unprinted substrate carrier may then be moved by means of the transport device from the cooling chamber into the construction chamber before, using the same transport device, a substrate member which has just been printed is moved from the construction chamber into the cooling chamber. In this manner, the method may be configured in a more efficient manner since the movement of the transport device in both directions is used in each case to move a substrate carrier.

In a development of the invention, it is proposed that the cooling chamber is heated for controlled cooling of a printed substrate carrier and/or for preheating a substrate carrier which is still unprinted. By controlled cooling, the shrinkage of the workpiece can be counteracted so that it takes place—if at all—in a defined manner. Preferably, the temperature in the cooling chamber can be raised at least approximately to the temperature prevailing in the construction chamber so that the workpiece is not subjected to any temperature shock when it is moved from the construction chamber into the cooling chamber. By preheating a still unprinted substrate carrier, the subsequent printing operation can be started more quickly.

It is further proposed that a substrate carrier which is still unprinted be placed from the cooling chamber under a printed substrate carrier which is arranged in the construction chamber and the printed substrate carrier be subsequently moved into the cooling chamber. In this manner, the efficiency of the method can be further increased. The placement and movement of the substrate carriers are carried out preferably by means of the transport device already mentioned, wherein it may also be a robot arm. In order to facilitate the gripping of a substrate carrier and/or to fix the position thereof during transport, it may have at least one recess in which the transport device engages.

Preferably, a substrate carrier has a printable surface which is provided with a special coating in order to improve the adhesion of the liquid thermoplastic material on the surface.

In order to achieve the objective mentioned in the introduction, an apparatus for the additive manufacturing of a three-dimensional workpiece from a thermoplastic material which is liquefied by means of heating is further proposed. The apparatus comprises a construction chamber for receiving a substrate carrier on which the workpiece can be built up in layers. According to the invention, in addition to the construction chamber there is provided a cooling chamber which is arranged adjacent to the construction chamber so that the workpiece which is built up in layers on the substrate carrier can be moved for cooling and solidifying the thermoplastic material from the construction chamber into the cooling chamber.

As a result of the additionally provided cooling chamber, the time in which a workpiece remains in the construction chamber is shortened since the method steps of cooling and solidifying the workpiece take place outside the construction chamber in the cooling chamber. In the construction chamber, after removal of the workpiece the next workpiece can immediately be produced. The cycle times are thereby reduced.

Preferably, the construction chamber can be heated in order to maintain a constant temperature during the production of the workpiece. The temperature can also be maintained after a workpiece has been completed since the cooling and solidification of the workpiece are carried out outside the construction chamber. Preferably, the construction chamber remains constantly heated so that time-consuming cooling and reheating phases which can take several hours are dispensed with.

The apparatus proposed is preferably a 3D printer. This differs from known 3D printers in that at least two chambers are provided, wherein a first chamber acts as a construction chamber and another chamber acts as a cooling chamber. The cooling chamber may in this instance also be constructed as a separate unit which can be docked to the 3D printer adjacent to the construction chamber. In this manner, 3D printers which have only one construction chamber can be retrofitted to form an apparatus according to the invention.

In order to accelerate the cooling process, the cooling chamber can preferably be cooled down, for example, by being acted on with cool air.

According to a preferred embodiment of the invention, the construction chamber and the cooling chamber are separated from each other by means of a movable wall. Via the movable wall, a connection of the construction chamber to the cooling chamber can be produced in order to move a completed printed workpiece directly from the construction chamber into the cooling chamber. Preferably, the wall can be displaced, in particular raised and/or lowered, in order to produce a connection between the cooling chamber and the construction chamber. A displaceable wall can be produced in a particularly simple manner and further requires little construction space.

In a further preferred manner, there is provided a transport device by means of which a workpiece which is built up in layers on a substrate carrier can be moved, preferably displaced and/or pivoted, from the construction chamber into the cooling chamber. The transport device enables an automation of the removal of the workpiece from the construction chamber so that no manual intervention is required. Preferably, the transport device is configured to displace and/or pivot the workpiece which is built up in layers on the substrate carrier. In this instance, the substrate carrier and the workpiece are preferably moved in such a manner that the workpiece retains its orientation with respect to the substrate carrier.

Ideally, the transport device is further configured to move a new unprinted substrate carrier from the cooling chamber into the construction chamber. The placement of a new substrate carrier in the construction chamber can accordingly also be automated. That is to say that the printing component change is carried out in a completely automated manner and requires no manual intervention.

Preferably, the transport device comprises at least one longitudinally and/or vertically adjustable arm which is preferably arranged in the cooling chamber. For longitudinal and/or vertical adjustment, the arm can, for example, be deployed in a telescope-like manner. Furthermore, the transport device may comprise a robot arm, in particular a 6-axis robot arm, which can be moved in all spatial directions.

In a further preferred manner, the transport device comprises drive means, in particular a motor and/or a lifting cylinder. Such drive means enable the construction of a coupler mechanism in order to produce an automatic longitudinal and/or vertical adjustment, for example, in a similar manner to the kinematics of a trunk lid. The drive means are preferably arranged outside the cooling chamber in order to protect them from high temperatures.

Advantageously, the cooling chamber can be heated for controlled cooling of the printed substrate carrier and/or for preheating a still unprinted substrate carrier. By controlled cooling, shrinking processes can be prevented or controlled in a selective manner. By preheating a still unprinted substrate carrier, the production can be accelerated.

BRIEF DESCRIPTION OF THE DRAWING

The method according to the invention and the apparatus according to the invention are described in greater detail below with reference to the appended drawings.

The single drawing FIGURE shows a perspective sectioned view of an apparatus according to the invention, the apparatus being a 3D printer.

DETAILED DESCRIPTION

The apparatus illustrated in the FIGURE comprises two chambers, a construction chamber 3 and a cooling chamber 4, which are arranged beside each other and which are separated only by a wall 5. In the construction chamber 3, three-dimensional workpieces 1 are produced from a thermoplastic material. The thermoplastic material is liquefied for this purpose and applied in layers to a substrate carrier 2 so that the workpiece 1 which is intended to be manufactured is produced. Since a liquefied thermoplastic material is used, the printed workpiece 1 has to cool to solidify the material. The cooling and solidification are carried out in the cooling chamber 4 arranged adjacent to the construction chamber 3.

The wall 5 arranged between the construction chamber 3 and the cooling chamber 4 is movable in order to be able to produce a connection between the construction chamber 3 and the cooling chamber 4. The wall 5 may be lowered in the manner of a bulkhead (see arrow 8) so that a large opening is produced. Furthermore, there is provided a transport device 6 which comprises two longitudinally and vertically adjustable arms 7 for receiving a substrate carrier 2. The transport device 6 is received in the cooling chamber 4. In the deployed state, however, the arms 7 reach as far as a location in the construction chamber 3 so that an unprinted substrate carrier 2' resting on the arms 7 can be moved from the cooling chamber 4 into the construction chamber 3 (see arrow 9).

At the beginning of a printing operation, the construction chamber 3 is heated to process temperature, for example, by means of an integrated heating system (not illustrated). Printing is carried out on a substrate carrier 2 which is specially coated in order to improve the adhesion of the liquefied thermoplastic material to the surface of the substrate carrier. The substrate carrier 2 is positioned inside the construction chamber 3 on a printing bed 10. Via a reduced pressure or a stop pin, it can be fixed in position.

During the printing operation, the cooling chamber 4 is also heated to construction chamber temperature. On the arms 7 of the transport device 6 there rests another unprinted substrate carrier 2' which is already preheated in the cooling chamber 4 for the subsequent printing task. After the printing operation in the construction chamber 3 has ended, the wall 5 is lowered and the cooling chamber 4 opens toward the construction chamber 3. The arms 7 with the preheated substrate carrier 2' resting thereon move into the construction chamber 3 and push it below the printed substrate carrier 2. Subsequently, the printed substrate carrier 2 is gripped and moved into the cooling chamber 4. In order to grip a substrate carrier 2, it may have notches (not illustrated) in which corresponding locking means (not illustrated) of the arms 7 engage. If the transport device 6 is completely retracted again, the wall 5 is raised in order to separate the construction chamber 3 and the cooling chamber 4 from each other since, in order to begin the cooling operation, the cooling chamber 4 is cooled, whilst the construction chamber 3 is moved into thermal equilibrium in order to print a new workpiece 1. After the workpiece 1 which has already been printed is cooled, it is removed from the cooling chamber 4 and a new unprinted substrate carrier 2' is introduced for preheating.

The invention claimed is:

1. An apparatus for additive manufacturing of a three-dimensional workpiece (1) from a thermoplastic material which is liquefied by heating, the apparatus comprising a construction chamber (3) for receiving a substrate carrier (2, 2') on which the workpiece (1) can be built up in layers, and a cooling chamber (4) which is arranged adjacent to the construction chamber (3) so that the workpiece (1) which is built up in layers on the substrate carrier (2) can be moved for cooling and solidifying the thermoplastic material from the construction chamber (3) into the cooling chamber (4), wherein the construction chamber (3) and the cooling chamber (4) are separated from each other by a movable wall (5), the apparatus being configured such that, after cooling and solidification of the material, the substrate carrier (2) with the workpiece (1) is removed from the cooling chamber (4) and replaced with a still unprinted substrate carrier (2').

2. The apparatus as claimed in claim 1, further comprising a transport device (6) for moving a workpiece (1) which is built up in layers on a substrate carrier (2) from the construction chamber (3) into the cooling chamber (4).

3. The apparatus as claimed in claim 2, characterized in that the transport device (6) comprises at least one longitudinally and/or vertically adjustable arm (7).

4. The apparatus as claimed in claim 2, characterized in that the transport device (6) comprises drive means.

5. The apparatus as claimed in claim 2, characterized in that the transport device (6) comprises at least one longitudinally and/or vertically adjustable robot arm (7).

6. The apparatus as claimed in claim 2, characterized in that the transport device (6) comprises at least one longitudinally and/or vertically adjustable robot arm (7) arranged in the cooling chamber (4).

7. The apparatus as claimed in claim 2, characterized in that the transport device (6) comprises a motor and/or a lifting cylinder.

8. The apparatus as claimed in claim 2, characterized in that the transport device (6) comprises a motor and/or a lifting cylinder arranged outside the cooling chamber (4).

9. The apparatus as claimed in claim 1, characterized in that the cooling chamber (4) is configured to be heated for controlled cooling of the printed substrate carrier (2) and/or for preheating a still unprinted substrate carrier (2').

10. The apparatus as claimed in claim 1, wherein the construction chamber (3) is configured to be heated.

11. The apparatus as claimed in claim 1, further comprising a transport device (6) for moving a workpiece (1) which is built up in layers on a substrate carrier (2) from the construction chamber (3) into the cooling chamber (4), wherein the transport device displaces or pivots the workpiece.

12. A method for additive manufacturing of a three-dimensional workpiece (1) using the apparatus of claim 1, the method comprising changing a thermoplastic material by heating to a liquid phase, selectively applying the thermoplastic material in the liquid phase at locations predetermined by the shape and the dimensions of the workpiece (1), wherein the workpiece (1) is built up in layers on a substrate carrier (2), and thereafter, to cool and solidify the material, moving the workpiece (1) which is built up in layers on the substrate carrier (2) from a construction chamber (3) into a cooling chamber (4) which is separated by a movable wall (5) from the construction chamber (3), wherein after cooling and solidification of the material, the substrate carrier (2) with the workpiece (1) is removed from the cooling chamber (4) and replaced with a still unprinted substrate carrier (2').

13. The method as claimed in claim 12, characterized in that, in order to move the workpiece (1) which is built up in layers on the substrate carrier (2), the substrate carrier (2) is moved by a transport device (6).

14. The method as claimed in claim 12, characterized in that the cooling chamber (4) is heated for controlled cooling of the printed substrate carrier (2).

15. The method as claimed in claim 14, characterized in that the cooling chamber (4) is also heated for preheating a substrate carrier (2') which is still unprinted.

16. The method as claimed in claim 12, characterized in that a substrate carrier (2') which is still unprinted is placed from the cooling chamber (4) under a printed substrate carrier (2) which is arranged in the construction chamber (3) and the printed substrate carrier (2) is subsequently moved into the cooling chamber (4).

17. The method as claimed in claim 12, wherein the construction chamber is heated.

18. The method as claimed in claim 12, characterized in that, in order to move the workpiece (1) which is built up in layers on the substrate carrier (2), the substrate carrier (2) is displaced and/or pivoted by a transport device (6).

19. The method as claimed in claim 12, characterized in that the cooling chamber (4) is heated for preheating a substrate carrier (2') which is still unprinted.

\* \* \* \* \*